United States Patent
Hartig et al.

(10) Patent No.: US 11,565,951 B2
(45) Date of Patent: Jan. 31, 2023

(54) SYSTEM AND METHOD FOR PROVIDING WATER

(71) Applicant: EXERGENE TECHNOLOGIE GMBH, Hamburg (DE)

(72) Inventors: Uwe Hartig, Bönnigheim (DE); Horst Pramor, Siek (DE); Norbert Jürgen Puls, Hamburg (DE); Carsten Wermter, Hamburg (DE)

(73) Assignee: EXERGENE TECHNOLOGIE GMBH, Hamburg (DE)

( * ) Notice: Subject to any disclaimer, the term of this patent is extended or adjusted under 35 U.S.C. 154(b) by 765 days.

(21) Appl. No.: 15/103,510

(22) PCT Filed: Dec. 11, 2014

(86) PCT No.: PCT/EP2014/077451
§ 371 (c)(1),
(2) Date: Jun. 10, 2016

(87) PCT Pub. No.: WO2015/086773
PCT Pub. Date: Jun. 18, 2015

(65) Prior Publication Data
US 2016/0311702 A1 Oct. 27, 2016

(30) Foreign Application Priority Data
Dec. 12, 2013 (EP) ..................... 13196968

(51) Int. Cl.
*C02F 1/44* (2006.01)
*F24D 17/00* (2022.01)
(Continued)

(52) U.S. Cl.
CPC ............ *C02F 1/444* (2013.01); *B01D 61/145* (2013.01); *B01D 61/146* (2022.08); *B01D 61/22* (2013.01);
(Continued)

(58) Field of Classification Search
None
See application file for complete search history.

(56) References Cited

U.S. PATENT DOCUMENTS

| | | | | |
|---|---|---|---|---|
| 3,959,087 A | * | 5/1976 | Morrow | G01N 27/4045 205/778.5 |
| 4,767,511 A | * | 8/1988 | Aragon | C02F 1/46104 204/228.6 |

(Continued)

FOREIGN PATENT DOCUMENTS

| DE | 20208814 U1 | 8/2002 |
|---|---|---|
| DE | 202005019293 U1 | 3/2006 |

(Continued)

OTHER PUBLICATIONS

Oxford Dictionary, "The Concise Oxford Dictionary, Tenth Edition," ed. Judy Pearsall, Oxford University Press, New York, 1999, 3 pages. (Year: 1999).*

(Continued)

*Primary Examiner* — Chester T Barry
(74) *Attorney, Agent, or Firm* — Saffire IP; Daren P. Nicholson (57) ABSTRACT

The invention generally relates to the filed of providing a liquid for human consumption. In particular, the invention relates to a system for channeling a liquid such as particularly an aqueous liquid such as water in a circuit and for controlling the contamination of the circulating liquid with microorganisms, as well as to a corresponding method using the same.

Furthermore, the invention relates to a method for the effective energy saving in the course of providing a heated liquid for human consumption while controlling the limit values recommended, admissible or acceptable for microorganisms, in which the set temperature of a heating device (Continued)

(8) is adjusted to a value below 60° C., preferably to a value between 40 and 55° C., most preferably to a value between 43 and 48° C.

15 Claims, 4 Drawing Sheets

(51) Int. Cl.
    *B01D 61/22*     (2006.01)
    *B01D 65/02*     (2006.01)
    *B01D 61/14*     (2006.01)
    *C02F 1/32*     (2006.01)
    *C02F 103/42*     (2006.01)
    *C02F 1/28*     (2006.01)
    *C02F 1/02*     (2006.01)

(52) U.S. Cl.
    CPC .............. *B01D 65/02* (2013.01); *C02F 1/325* (2013.01); *F24D 17/0073* (2013.01); *F24D 17/0078* (2013.01); *B01D 2311/25* (2013.01); *B01D 2313/22* (2013.01); *C02F 1/02* (2013.01); *C02F 1/281* (2013.01); *C02F 1/32* (2013.01); *C02F 2103/42* (2013.01); *C02F 2209/03* (2013.01); *C02F 2209/36* (2013.01); *C02F 2301/043* (2013.01); *C02F 2301/046* (2013.01); *C02F 2303/04* (2013.01)

(56) References Cited

U.S. PATENT DOCUMENTS

| | | | | |
|---|---|---|---|---|
| 5,208,923 | A * | 5/1993 | Stiver | ........................ C02F 1/76 210/167.11 |
| 6,453,938 | B1 * | 9/2002 | Ebster | ................. F24D 17/0078 137/563 |
| 2012/0027735 | A1 * | 2/2012 | Beland | ...................... A61P 1/14 514/23 |

FOREIGN PATENT DOCUMENTS

| | | | | |
|---|---|---|---|---|
| DE | 202006011667 U1 * | 11/2006 | .............. | C02F 1/444 |
| DE | 202006011667 U1 | 11/2006 | | |
| DE | 202011003127 U1 * | 6/2011 | ................ | C02F 9/00 |
| DE | 202011003127 U1 | 6/2011 | | |
| EP | 2474506 B1 | 7/2013 | | |
| WO | WO-2012079740 A1 * | 6/2012 | .............. | C02F 1/001 |
| WO | 2014/096845 A1 | 6/2014 | | |

OTHER PUBLICATIONS

PCT/EP2014077451 International Search Report dated Feb. 5, 2014.
Verordnung über die Qualität von Wasser für den menschlichen Gebrauch (Trinkwasserverordnung—TrinkwV 2001), Bundesministerium der Justiz und fur Verbraücherschutz, May 21, 2001.
Wasserspeicher (Weitergeleitet von Schwallwasserbehalter), Wikipedia, Die freie Enzyklopädia, https://de.wikipedia.org/wiki/Wasserspeicher#Schwallwasserbehälter (screenshot) Aug. 26, 2020.
Google Translate, translation of Schwallwasserbehälter from German to English, https://translate.google.com/#view=home&op=translate&sl=de&tl=en&text=Schwallwasserbehälter (screenshot) Aug. 26, 2020.
Edwards et al., The Role of Transportation in Campus Emergency Planning, FEMA Higher Education Conference, Emmitsburg, Maryland, Jun. 8, 2010.
CDC Press Release: "CDC study finds fecal contamination in pools" (2013) https://www.cdc.gov/media/releases/2013/o0516-pool-contamination.html.
Arnow et al. Journal of Infectious Diseases (152: 1; Jul. 1985).
Legionella, K. Botzenhart, Hygiene-Institut des Universität, Tubingen, Germany, World Health Organization, Mar. 1, 2003, https://www.who.int/water_sanitation_health/dwq/admicrob4.pdf.
Legionella: Drinking Water Health Advisory, EPA Mar. 2001.
Falkinham, Environmental Health Perspectives, vol. 123, No. 8 Aug. 2015, 754.
Title 17 Code of Regulations "California Regulations Related to Drinking Water" § 141.714 "Requirements for uncovered finished water storage facilities," Apr. 16, 2019.
Rules of Tennessee Department of Environment and Conservation, Public Water Systems, Chapter 0400-45-01.17, updated Feb. 2019.
Health and Safety Executive, HSG282, HSE Guidance on Legionella Control in Pools & Spas, The control of legionella and other infectious agents in spa-pool systems 2017 (http://www.pioneermaintenanceservices.co.uk/wp-content/uploads/hsg282.pdf.
CDC Legionella and HotTubs/Spas updated Jul. 14, 2020 https://www.cdc.gov/healthywater/pdf/swimming/resources/legionella-factsheet.pdf.
Bromine as a drinking water disinfectant, World Health Organization 2018, http://www.who.int/water_sanitation_health/water-quality/en/.
Toolkit for Controlling Legionella in Common Sources of Exposure (Legionella Control Toolkit) Infomnation on Controlling Legionella in Commonly Implicated Sources of Legionnaires' Disease Outbreaks, CDC, Jan. 13, 2021.
Freispiegelleitung, Wikipedia, Die freie Enzyklopädia, https://de.wikipedia.org/w/index.php?title=Freispiegelleitung&oldid=11, last updated Apr. 29, 2013.
Druckrohrleitung SKHwissen HaustechnikDialog at https://www.haustechnikdialog.de/SHKwissen/2163/Druckrohrleitung?pr, last updated Jul. 29, 2013.
Deutsche Vereinigung des Gasund Wasserfaches e.V., Technical rule, worksheet W551, Apr. 2004.
Bendesanzeiger, Bekanntmachung, Umweltbundesamt, Bekanntmachung der Liste der Aufbereitungsstoffe und Desinfektionsverfahren gemäß §11 der Trinkwasserverordnung—17. Änderung—(Stand: Nov. 2012) (Federal Gazette, Federal Environment Agency, Notice, List of treatment substances and disinfection processes according to § 11 Drinking Water Ordinance Nov. 2012 Germany), pp. 20 and 21 are translated.
Verordnung über die Qualität von Wasser für den menschlichen Gebrauch (Trinkwasserverordnung—TrinkwV 2001), Dundesministerium der Justiz und fur Verbraücherschutz, May 21, 2001. English translation of Appendices.
Wasserspeicher (Weitergeleitet von Schwallwasserbehälter), Wikipedia, Die freie Enzyklopädia, https://de.wikipedia.org/wiki/Wasserspeicher#Schwallwasserbehälter last updated Sep. 10, 2013.
Verordnung zur Novellierrung der Trinkwasserverordnung (German Drinking Water Ordinance [GDWO]) 2001 Appendix 3, Nos. 9 and 10, May 28, 2001 Announcement.
Verordnung zur Novellierrung der Trinkwasserverordnung (German Drinking Water Ordinance [GDWO]) 1990 Appendix 1, No. 5, Dec. 5, 1990 Announcement.
"About the Commonly Used Pore Sizes and Materials of Filter Membranes," Hawach Scientific, https://www.hawachmembrane.com/about-the-commonly-used-pore-sizes-and-materials-of-filter-membranes/, screenshot Aug. 29, 2022.
Meltzer et al., "The Sterilizing Filter and Its Pore Size Rating," American Pharmaceutical Review, Sep. 2003.

* cited by examiner

FIG. 1

*Prior Art*

SYSTEM AND METHOD FOR PROVIDING WATER

CROSS REFERENCE TO RELATED APPLICATIONS

This is a US national phase application under 35 U.S.C. § 371 of international application PCT/EP2014/077451, filed Dec. 11, 2014, which itself claims benefit of priority to European patent application EP 13196968.5, filed Dec. 12, 2013; the entire content of which is herein incorporated by reference in its entirety.

TECHNICAL FIELD

The invention generally relates to the field of water provision. In particular, the invention relates to a closed pipe system for channeling a liquid such as in particular water in a circuit and for controlling the contamination of the liquid channeled in circuit with microorganisms, as well as to a corresponding method using the same. Further, the invention relates to a method for the efficient save of energy in the context of providing a heated liquid for human consumption (drinking, washing, showering) under control of the standard values as recommended, permissible or acceptable for microorganisms.

BACKGROUND OF THE INVENTION

It is to be understood that the following explanations exemplarily relate to aqueous liquids such as, in particular, water but are also valid for other liquids.

The water provided for operational, sanitary and drinking purposes of human consumption is subject to strict hygiene requirements whose compliance is regulated and controlled by a variety of regulations. Upon violation of these regulations, aside from health risks for the persons concerned, substantial consequences are imminent for those responsible. Therefore, arrangements have to be made in order to secure a sufficiently high quality of the water intended for human consumption at any time.

Basically, there are two ways in which water, even if it is fed into a piping system in an unobjectionable manner, may be contaminated. Firstly, undesired components such as, in particular, microorganisms may be present in this piping system which come into contact with the water thereby contaminating the same. Particularly, the pipe walls but also sealings, pumps, valves and the like may be typical sources. Secondly, a few germs being fed with a liquid into the system may, under favorable conditions, develop to numerous colonies of microorganisms which manifest themselves in the system either as free floating or as being fixed at a surface as a so-called biofilm. Legionella causing severe health problems are named as exemplary microorganisms. Such microorganisms may, for example, be taken up upon assimilating food. However, for Legionella in particular, inhalation of pathogen-containing, respirable aerosols from the hot water region is regarded as main path of infection. Accordingly, also showers or aerosols emerging at the point of withdrawal (water-tap) represent sources of danger. It is known in this context that such microorganisms predominantly propagate upon stagnation, i.e. in standing water, or also within at least temporarily closed circulation piping systems, whereas they do not cause problems in continuously floating pipes of a comparatively open system. Since a steady streaming of water is normal in industrial-scale water processing, the invention particularly focuses on piping systems with approximate withdrawal, as can be found e.g. in hospitals, swimming pools, schools, sports halls, fitness centers, hotels, youth centers and old-age homes, but also in single- and multi-family houses.

One method for the mortification of said microorganisms is to use ultraviolet light (UV light). The high-energy light destroys the organisms, with the dead components still being present in the water. For one thing, this is sanitarily unacceptable, for another thing even these components may act toxic or allergenic as long as they are present in the water and e.g. are incorporated via ingestion. A further problem arises from mutual shadowing of the microorganisms during irradiation which is why this measure commonly does not result in a complete mortification of all microorganisms. Further, spore-building organisms are to be considered whose spores are not always accessible for a mortification by UV-light. Thus, this approach for the contamination control of operational, sanitary and drinking water for human consumption may only be followed if the irradiation unit is traversed several times or if several irradiation units are arranged sequentially, which involves correspondingly high time and power expenditure.

Another method for securing tap-water quality is directed to heat the water such that the organisms are denatured. For this purpose, the required temperature typically ranges between 60 and 70° C. Adversely, this again implies the presence of the denatured remnants in the water and requires high energy input necessary to heat the water. In case the water to be withdrawn from a tap shall (again) be cold, a cooling of the same is often necessary which again requires energy.

Common to both methods is that the subsequent disinfection of the water is complex and thus costly, and that additional measures have to be taken to remove the dead microorganisms from the water before it is withdrawn from a tap.

For the removal of particles of a certain size, corresponding finely designed filter can be used. Particularly advantageous are so-called ultrafiltration systems (UF-systems). In these systems the contaminated water typically streams through a multitude of thin capillaries having lateral filter openings of a defined size. Only the purified water emerges from these openings, whereas the remaining water continuously being enriched with impurities at the end of the capillary is periodically or continuously guided to a disposal discharge. The purified water from the multitude of capillaries is, however, centrally collected and available at the filter outlet. Here, it can be withdrawn from a tap or fed into a pipe system for clean water. Ultrafiltration systems are suitable and known for the removal of said microorganisms as well as of other suspended matter. Water-soluble substances, such as e.g. health-damaging salts (mono- or bivalent ions), or toxics such as e.g. herbicides or uranium, cannot be solely handled with UF-techniques. Although such substances can well be separated from the water by reverse osmosis or electro-deionization, this would, however, cause a modification of the chemical composition of the water which is undesired. Only the so-called "nanofiltration" which operates with much smaller pore sizes than the similar UF-technology offers corresponding opportunities.

Whilst UF-systems involve higher initial costs than pore filters, they are, at least in the medium term, superior due to their more convenient cleaning.

However, the use of UV-systems has been problematic in those situations in which the water intended for human consumption and purified via ultrafiltration is not immediately withdrawn from the piping system, i.e. does at least temporarily not stream. As mentioned before, microorganisms may develop in circulating or standing cold or not sufficiently hot water and may, in the course of time, accumulate in such a manner that alarming germ titers are reached.

While this is irrelevant for the water still being present in the capillaries, a microbial re-growth in the liquid volume present downstream of the UV-unit, in the course of time of its standing, results in a re-contamination which is to be avoided by all means. Due to the typically very large surface of such filter systems, catalytic contaminations with extremely high exceedance of limit may develop. To avoid this problem, the UV-systems are regularly rinsed with chemical cleaning liquid and/or disassembled and mechanically cleaned. Both methods have drawbacks since, in one case, harmful substances may again be introduced into the piping system, and since, in the other case, corresponding outage times have to be considered.

A further problem relates to the possibilities to determine an undue burden of the water intended for human consumption (drinking, showering, washing) with undesired components such as, in particular, microorganisms in real-time. According to the prior art, the piping system of almost every building may be affected by contamination with e.g. Legionella without being able to preventively detect this by means of common sampling operation requiring up to 10 days which is clearly too long.

Applicant's EP 2 474 506 B1 discloses a solution for the above-mentioned problem of a re-contamination of an at least temporarily non-streaming liquid volume which has already passed an ultrafiltration unit by providing a bypass over which this liquid volume may again be directed to the ultrafiltration unit, wherein the bypass comprises a further ultrafiltration unit. By following this technical teaching the germ load in the piping system in question can be reduced significantly, if not completely eliminated.

SUMMARY OF THE INVENTION

Starting from the solution approach of the applicant according to EP 2 474 506 B1 as outlined above, the object of the present invention is to provide and use a closed piping system for channeling a liquid in a circuit, by the aid of which the goal of an efficient control of the contamination of a liquid intended for human consumption with microorganisms can be realized simpler and more cost-effective.

In particular, the system and the method shall be suitable for operation in the field of public distribution networks such as e.g. in swimming pools, in care facilities or in sport halls, as well as for use in a domestic environment of public or private mains systems.

Furthermore, the present invention shall be able to make a significant contribution to energy saving when providing a heated liquid for human consumption.

Additionally, the system and the method shall, independent from the level of contamination, always be able to comply with admissible, recommended or acceptable standards for microorganisms.

In the following, the piping system according to the invention is described in detail at first.

The piping system according to the invention, which, in a non-operating state without an opened point for the feed-in, withdrawal and/or maintenance is a closed circuit, for channeling a liquid in a circular flow (circulation piping) and for controlling the contamination of the circulating liquid with microorganisms comprises, according to a first embodiment, a closed (s.a.) circulation piping with a circulating means and at least one point each for feeding a liquid into as well as for the withdrawal or discharge of a liquid from the circulation piping, and a single ultrafiltration unit for the mechanical separation of microorganisms, as well as a bypass in which the single ultrafiltration unit is arranged.

As microorganisms, in particular organic pathogenic solids such as viruses, bacteria, fungi and fungal spores, as well as constituents of the same come into consideration.

The system thus generally relates to the field of providing a circulating, particularly aqueous liquid for human consumption which is required to comply with (legally) admissive, recommended or acceptable standards. Since the piping system has at least one point for withdrawing liquid from the system, it additionally has at least one point for feeding a liquid into the system. This point can e.g. be a connection to the service pipe for the tap water distribution network of a public or private building for commercial or residential property purposes.

In order to circulate the liquid present in the pipe system, the circulation piping comprises at least one circulation means such as e.g. a pump suitable for continuous operation that allows to force a certain streaming direction.

The disclosed piping system thus represents a predominantly closed system which only temporarily, such as e.g. during a feeding-in, withdrawal or maintenance operation does not meet the criteria of a closed system. In the context of the present description, this (temporally) predominantly closed circulation piping is also named main stream conduit in which the liquid circulates in a preset streaming direction.

In contrast to the technical teaching of EP 2 474 506 B1, the ultrafiltration unit is, however, not positioned in the main stream conduit, but in an additional conduit section which presently is named bypass, bypass-conduit or secondary stream conduit. On the basis of the efforts spent for the invention, such as the comparative evaluation of numerous experimental set-ups, and the obtained data sets for the respective germ load, it has shown surprisingly that an admissible, recommended or acceptable contamination of a liquid provided for withdrawal can also reliably be ensured if the ultrafiltration unit is not arranged in the main stream conduit, but solely in the secondary stream conduit (bypass, bypass-conduit), and is only passed at certain times, preferably demand-orientated such as e.g. triggered by an elevated germ load. Preferably, the bypass comprises a conveyance means such as e.g. a pump, as well as connections such as e.g. valves, by the aid of which the liquid of the main stream can be fed-into or guided-out from the bypass, or else guided past the bypass.

Since the problem of an undesired rise of the germ titer in at least temporally non-streaming conduit sections downstream of an ultrafiltration unit as discussed in EP 2 474 506 B1 and as presently being the case in the conduit section of the bypass between the outlet of the ultrafiltration unit and the connection to the circulation piping persists, it is suggested in a further preferred embodiment to at least partially (re-) direct the liquid volume present in this conduit section to the ultrafiltration unit. Thus, the secondary stream conduit of the system according to the invention, according to a further preferred embodiment, comprises a conduit section presently named secondary-bypass over which the conduit section of the bypass (secondary stream conduit) between the outlet of the ultrafiltration unit and the connection to the circulation piping is connected with the conduit section of the bypass between the connection to the circulation piping and the inlet of the ultrafiltration unit. Preferably, also this secondary bypass comprises a conveyance means such as e.g. a pump as well as preferably a means to prevent backflow such as e.g. a check valve, wherein the pump when appropriately designed may also take over this function. It is further preferred that this means for preventing backflow is provided as a further unit for the mechanical separation such as, in particular, as a further ultrafiltration unit (secondary ultrafiltration unit). Preferably, the conduit section of the secondary stream conduit (primary bypass)downstream of the primary ultrafiltration unit between the outlet of the secondary bypass and the connection to the circulation piping comprises a magnetic valve which closes when the primary bypass is deactivated and the secondary bypass is activated. In addition or alternatively, it may be preferred that the primary ultrafiltration unit can be separated from the circulation piping by means of two valves in the bypass, wherein these two valves for this purpose are arranged both before as well as after the primary ultrafiltration unit. According to a continuation of this embodiment, the bypass (with or without secondary ultrafiltration unit) comprises a secondary bypass with a further valve, wherein the conveyance means of the secondary stream conduit, at least in this case, is arranged between the connection of the secondary bypass with the primary bypass and the primary ultrafiltration unit. Since both of the afore-mentioned valves, when seen in the streaming direction of the secondary stream conduit, are arranged in the secondary stream conduit both upstream and downstream of the secondary bypass, the residual liquid being present in the primary ultrafiltration unit can again be guided to the primary ultrafiltration unit in the (small) circuit via the secondary bypass, as long as both valves of the secondary stream conduit are closed, the further valve in the secondary bypass is opened and the conveyance means in the secondary stream conduit is activated. The advantage of this preferred embodiment relies in the fact that a self-purification of the primary ultrafiltration unit, independent of possible impurities from the circulation piping, is enabled.

In order to clean the ultrafiltration unit by e.g. rinsing, it is preferably provided with an outlet to discharge rinsing liquid, which is also valid for the secondary ultrafiltration unit optionally present. This point for the discharge of rinsing liquid as well as the afore-mentioned points for the feed-in of liquid into and for the withdrawal of liquid from the system are only temporally opened upon demand and thus do not contravene the explanations of a closed piping system as presented herein. The determining feature of a closed piping conduit system according to the invention is that the liquid intended for human consumption being channeled therein is maintained within the system (particularly on this side of the points) until its usage, not at any time being exposed to contact with e.g. ambient air or other contamination sources. In particular, the closed piping system according to the invention does not comprise any pipe-free sections or areas such as e.g. basins, free-fall distances or the like, irrespective of whether these pipe-free sections, with respect to ambient air or other contamination sources, are designed in a closed or open manner.

In a preferred embodiment, the system according to the invention further comprises a device for heating or cooling, through which the circulation piping is passed to heat or cool the liquid channeled therein. The device for heating serves to provide a heated liquid for human consumption which can be withdrawn from the at least one point of withdrawal (e.g. a shower), and is e.g. provided in the form of a boiler, heat exchanger or the like. In an analogous manner, a device for cooling serves to provide a cooled liquid as e.g. required in an air conditioner as point of withdrawal. In this manner, the provision of air conditioners supplied with a cooled liquid is enabled, without causing contamination of the distributed cooled air as encountered when using common systems.

As mentioned before, the liquid passes the secondary conduit and thus the single ultrafiltration unit (also named primary ultrafiltration unit in a preferred embodiment), preferably in a demand-oriented manner. This means that the system comprises points for sampling or points for the withdrawal of samples such that the actual burden of the circulating liquid intended for human consumption with regard to the presence of microorganisms can be determined as early as possible, preferably in real-time. If the measured germ titer has elevated to a certain predetermined limit value, the bypass can be opened and the circulating liquid can be guided through the ultrafiltration for so long or so often until the level of the germ titer has been reduced to a predetermined value. With regard to the possible creation of an automatic feedback control system which enables to control the opening and pass-through of the bypass of the system according to the invention, preferably in real-time, the system, according to a further preferred embodiment, comprises at least one diagnostic means for the qualitative and/or quantitative determination of microorganisms in the liquid. Alternatively or additionally, the control, however, may also be carried out on the basis of empirical data. For example, it has been shown after analysis of the measuring data of a pilot plant designed according to the invention that it may be sufficient for complying with desired contamination values, to guide the liquid through the ultrafiltration unit after a certain number of hours such as e.g. once or twice a day.

According to a further preferred embodiment, the piping system serves to provide a heated liquid for human consumption (drinking, showering, washing) which is why it comprises a device for heating through which runs the circulation piping for heating the liquid guided therein, whereby the piping system as described before meets the criterion of a hot water-bearing piping system. The heated water as an example for a heated liquid may be supplied to a consumption unit such as e.g. a shower at the at least one point of withdrawal, wherein the consumption unit, in addition to this hot water-bearing piping, is supplied with a further, cold water-bearing piping, such that the consumption unit, by mixing of heated and cold water, can provide water having a desired temperature. According to this embodiment, the afore-described system, in addition to the circulation piping (main stream conduit) and the bypass (secondary stream conduit; optionally with secondary bypass), comprises a further piping which is connected with the circulation piping via its points for the feed-in and withdrawal (discharge). This further piping comprises two functionally different but interconnected conduit sections A and B, one point for feeding a (preferably cold) liquid into the conduit, as well as a valve which is arranged in conduit section A. Via the conduit section B, fresh (preferably cold) water can be fed into the closed circulation piping over its point for the feed-in of a liquid, while also fresh (preferably cold) water can be guided to the valve via conduit section A. In this context, conduit section A does represent a cold water-bearing piping, at least in the region between the cold water-point and the valve. The valve may be part of a consumption unit such as e.g. a shower or a washstand or functionally allocated thereto. Preferably, the valve is part of a mixing valve that enables to mix hot and cold water. Furthermore preferred, the conduit section A has a respective angle valve on both sides of the valve. The valve forms a junction between the heated liquid (hot water) fed into conduit section A from the point of withdrawal of a liquid of the closed circulation piping and the (cold) liquid (cold water) fed into conduit section A, which is why it is presently also named transition valve. The valve may be permanently open or designed as a control valve, with a temperature-controlled control valve such as e.g. a thermostat being most preferred. The valve allows the transition of hot water into the region of conduit section A that normally serves the channeling of cold water, but does not allow the transition of cold water into the hot water-bearing region of the same conduit section A. The (further) piping of the system according to the invention comprising both conduit sections A and B is, in the region of conduit section B, connected with the bypass (secondary stream conduit; primary bypass) via a suitable connection conduit upstream of the ultrafiltration unit (primary ultrafiltration unit, if applicable), wherein the connection conduit preferably has a valve. In this manner it is possible to not only use the ultrafiltration unit for the purification of the liquid present in the circulation piping, but in addition optionally also for the purification of the (cold) liquid fed into conduit section B, for the purification of the (e.g. stagnant) liquid present in the cold water-bearing region of conduit section A up to the transition valve, and/or for the purification of the (e.g. stagnant) liquid present in the hot water-bearing region of conduit section A up to the transition valve. It is further preferred that the bypass (secondary stream conduit; primary bypass) is connected with conduit section B via a further connection conduit downstream of the ultrafiltration unit (primary ultrafiltration unit, if applicable), wherein also this connection conduit preferably has a valve.

Preferably, the diagnostic means is arranged upstream of the at least one point of withdrawal, wherein an arrangement in the circulation piping between the bypass and the point of withdrawal is particularly preferred.

Such diagnostic means may particularly comprise microbiologic test units, operate on a chromatographic basis, and/or use molecular genetic such as e.g. microchip-based diagnostics, in order to measure the load (quantity) and/or to determine (qualitative) microorganisms. The use of laser particle counters or selective DNA-online-analytics is particularly preferred.

The ultrafiltration unit (herein also referred to as "UF-unit") operates mechanically, i.e. e.g. by the means of pores, through which only the liquid but not the undesired microorganisms may pass. Although the prefix "ultra" typically indicates a separation of particles having a size between 0.1 and 0.01 µm (if smaller, it is often called nanofiltration; if bigger, it is often called microfiltration), the practical filter type and its separation characteristics depend on the respective task and may also comprise the adjacent fields of filtration or rely on those. The preferred pore size is 0.02 µm such that molecular masses of ca. 100 to 150 kDa are filtered. The use of a mechanically operating unit results, beside others, in an advantageous save of energy. In addition, also constituents of dead microorganisms are filtered out reliably, which commonly is not the case when solely using UV-light and/or heating.

Ultrafiltration units are well-known in the art. Their operation is based on a perforated membrane whose pores only allow the passage of particles up to a certain size. Bigger particles are retained from the membrane. Thus, UF-units belong to surface filters, contrary to depth filters such as sand or gravel filters. The preferred design of an UF-unit is the setup in a column. The raw water is channeled to the UF-unit via a common entry region which branches into the internal space of a multitude of thin tubes or hollow fibers with a typical inner diameter of solely 0.7 to 2 mm, preferably 1.5 mm, as well as with a typical outer diameter of ca. 6.0 mm. In their walls, they comprise said pores through which the purified, i.e. processed water that is also called filtrate runs off into a space of withdrawal. In this space of withdrawal, the filtrate is collected and exits the UF-unit through a common output region. The material to be selected according to the field of application is characterized by a high chemical resistance. For drinking water purification, preferably polyether sulfone (short: PESU or PES) is chosen as material.

In case of the so-called "dead end" technology, all of the raw water is transferred into filtrate. In the course of time, however, more and more retained particles accumulate within the filter tubes. In order to at least reduce or prevent the particles from agglomeration and to avoid clogging of the pores, it is advantageous that the difference of pressure on both sides of the membrane is small. A value of less than 1 bar, e.g. 0.3 bar, has proven beneficial. In theory, a bigger pressure gradient results in a higher separation rate, but bears a higher risk of pore clogging and requires significantly more energy. Experience teaches that particularly good and also efficient results can be achieved with a technical setup allowing a pressure drop in the system of up to 0.3 bar.

In contrast, the contaminated liquid in the context of the so-called "cross-flow" technology continuously sweeps along one side of the filter, wherein always only part of the liquid passes through the pores to the purified side. The remaining, slightly concentrated liquid may then be circled and again guided alongside the filter. Although the problem of clotting does not exist, the low separation rate and the large amount of contaminated liquid to be recycled are disadvantageous.

In order to ensure a sustained operability of the filter, it has to be regenerated, i.e. cleaned or discharged, periodically. For this, the filter often comprises a rinsing region at the end of the column opposite to the entry region, which is interconnected with the albeit opposing ends of the inner space of the tubes or hollow fibers in an analogous manner. Upon opening of this rinsing region at least part of the liquid does not stream through the pores but rather rinses the particle concentrate from the tubes into the rinsing region from which it may be subjected to disposal via an outlet. As the case may be, the rinsing region may be opened temporarily or permanently such that only a certain percentage of the raw water is converted into filtrate. Correspondingly, dead-end and cross-flow technologies alternate with one another, if applicable. Besides, it may be advantageous to run the rinsing operation along with a (temporary) reversal of the streaming direction.

Advantageously, the UF-technology as compared to technologies such as purification by UV-light or heating does require significantly less energy and offers a safe operation even in cases of energy breakdown. By using UF-technology, water may be sterilized simply by mechanical means. In the case of correspondingly fine pores, even drug residues or heavy metals may be removed from raw water to a certain extent, although this more correctly belongs to the field of "nanofiltration". Thus, the UF-technology is able to comply with and exceed the high requirements, which particularly result from the revised German drinking water ordinance, according to which especially also the use of UF-systems for processing water for human consumption is admissible (see "Liste der Aufbereitungsstoffe and Desinfektionsverfahren gemäß § 11 Trinkwasserverordnung 2001", status 2010).

According to a preferred embodiment, the bypass conduit with the only ultrafiltration unit is, in consideration of the predominant streaming direction of the circulating liquid, arranged downstream of the at least one point of withdrawal such that the conveyance pump as well as the ultrafiltration unit in the bypass have to comply with lower throughput requirements as if they were present upstream of the point of withdrawal. Hereby, further cost advantages may be realized.

The pump as preferred circulation and/or conveyance means is particularly preferred selected from the group consisting of rotary pumps, membrane pumps, rotary reciprocating pumps, impeller pumps, eccentric pumps, piston pumps, hose or peristaltic pumps, screw pumps, and tooth belt pumps. As pump type, pumps of the type "rotary pump" are particularly preferred. Rotary pumps are available as e.g. radial pumps, diagonal pumps and axial pumps. These pump types are suitable, in particular due to their efficiency, reliability and their good availability at competitive cost.

It can also be envisaged to displace liquid volumes e.g. by using cartridges set under high pressure that is released at a suitable site in the piping system, thereby conveying the liquid. Such devices are particularly reasonable as emergency solution e.g. in order to rapidly provide an albeit limited amount of conveyance energy in case of an energy breakdown but is has to be ensured that a possibly developing overpressure can be relaxed at another site because otherwise no sufficient conveyance of liquid that normally is incompressible can be expected. Conveyance energy of this type may also be supplied via an external connection through which liquid or gas suitably pressurized can be fed into the system.

In the context of a further preferred embodiment, it is provided that the piping system according to the invention comprises at least one protection against damage or destruction of the ultrafiltration unit. Pressure surges due to fast starting pumps or magnetic valves closing too fast may result in rapid pressure rises in the system which may damage the mostly thin walled hollow fiber membranes. Also sharp-edged particles such as e.g. swarfs swimming with the raw water may damage the interior of the UF-unit. Against pressure peaks, preferably devices for the rapid pressure relief such as e.g. safety valves are to be provided and preferably arranged in the bypass conduit before the UF-unit. Sharp-edges particles may be filtered out of the raw water by the aid of appropriately insensible coarse filters upstream of the bypass.

According to a further embodiment, the system further comprises devices selected from the group consisting of biosensors, turbidity sensors, streaming sensors, pressure sensors, sand filters, UV-disinfector units, heat treatment units, sampling points, and sample collecting points.

By using one or several of said sensors, the aforementioned prompt assessment of the state of the water intended for human consumption present in the system can be carried out. The streaming or pressure sensors serve to assess the streaming state in the system such that a control circuit to be correspondingly provided preferably automatically ensures operation of the circulation and/or conveyance means if the point of withdrawal, optionally since a time span that can be predetermined, is closed. The filters serve the additional filtering-out of coarse components and/or the provision of an additional security against the occurrence of microbiological components, wherefore also the heat treatment may be used. The sampling point and the point(s) for sample collection serve e.g. to "inoculate" the raw water for functional tests of the sensor technology, e.g. the manual withdrawal for carrying out external water analyses in order e.g. to verify the purification function of the UF-unit.

In the following, the method according to the invention is disclosed in detail. For reasons of clarity, it is refrained from repeating the facts and circumstances already set forth for the system according to the invention.

Thus, the invention according to a further aspect relates to a method for channeling a liquid intended for human consumption in a circuit and for controlling the contamination of the circulating liquid with microorganisms by using a closed (s.a.) piping system which comprises a closed circulation piping with a circulation means and at least one point each for feeding a liquid into and for withdrawing of liquid from the circulation piping, one single ultrafiltration unit for the mechanical separation of microorganisms, and a bypass conduit having the single ultrafiltration unit arranged therein, wherein the control of the contamination of the circulating liquid for human consumption is carried out by at least partially and at least temporally directing this liquid to the ultrafiltration unit arranged in the bypass conduit.

It is preferred to continuously or discontinuously channel the loaded liquid present in the circulation piping to the ultrafiltration unit via the bypass conduit. A continuous feeding is preferred when a contamination is to be expected even during short-term circulation of the water, when a continuous assessment of the respective volume is necessary, as e.g. may be the case in hospitals, or when the streaming rates achievable with the circulation and/or conveyance means are very slow. Generally, a discontinuous feeding will suffice, in the course of which preferably a periodic assessment of the quantity and/or quality of microorganisms takes place. Only if a limit value is exceeded, the conveyance means preferably provided for the bypass conduit is operated for a longer time in order to ensure a desired purification of the contaminated water.

As already mentioned before, it is preferred that a quantitative and/or qualitative determination of microorganisms in the liquid is performed continuously or discontinuously. The arrangement of the measurement technique follows according to the user and plant demands, respectively. Preferably, the microbiologic genetic fingerprint is recorded. By optionally loading suitable sequences, the behavior of the system can be monitored and documented. The collection of samples required for this and thus the position of the checkpoint should preferably be arranged between the pure water end of the ultrafiltration unit in the bypass and the at least one point of withdrawal. Here, it is preferred that the measuring is performed periodically, program-controlled or demand-driven. Accordingly, the periodic measuring is performed in predetermined time intervals, whereas the program-controlled measuring is carried out at predetermined time points. As already set forth before, the demand-driven measuring is performed e.g. only when a defined state (e.g. accelerated propagation of microorganisms due to warming) is present which makes a rise in contamination likely.

With regard to a demand-driven measurement, it is particularly preferred that the feeding of liquid from the circulation piping via the bypass conduit into the ultrafiltration unit is performed in dependence of the data obtained. With other words, a conveyance means and sensors comprising control circuit is established which automatically performs a measuring of the microorganism count, starts the described conveyance circuit through the bypass on the basis of data collected, and, upon falling below the respective limit value, halts the same. It is clear that also a manual control of this operation should alternatively or additionally be possible, and that the control preferably leads to a protocol which e.g. may be read by an operator or stored for documentation purposes.

According to a further embodiment, the method further comprises a cleaning step for removing retained components such as particularly microorganisms from the ultrafiltration unit. For this, a cleaning agent, if applicable, is fed into the system upstream of the bypass, while the liquid, if applicable, together with the cleaning agent, flows off after passing the UF-unit particularly preferred via an outlet into a cleaning region from which it can be disposed instead of flowing into the region of the circulation piping downstream of the bypass conduit.

As already mentioned before, the system according to the invention, in a preferred embodiment, comprises a piping section in the course of the secondary stream conduit (primary bypass) named secondary bypass, over which the liquid of the secondary stream conduit between the outlet of the ultrafiltration unit (presently also termed primary ultrafiltration unit) and the connection to the circulation piping can again be fed into said ultrafiltration unit. Preferably, a further conveyance means such as e.g. a pump as well as a backflow preventing means such as e.g. a check valve are arranged in this secondary bypass, wherein it is particularly preferred that the conveyance means includes the function of the backflow preventing means. Mostly preferred, the secondary bypass comprises a conveyance means as well as a further possibly smaller designed ultrafiltration unit which is named secondary ultrafiltration unit herein. Preferably, the conveyance means arranged in the secondary bypass should be activated when the conveyance means in the primary bypass is not activated, i.e. when the liquid present in the secondary stream conduit does essentially not stream. A permanent operation of the secondary bypass upon non-activation of the conveyance means of the secondary stream conduit (the primary bypass) is, however, only necessary in case this is deemed to be appropriate on the basis of corresponding germ titers. Otherwise, the conveyance means of the secondary bypass may also only be activated temporarily such as e.g. periodically or at predetermined times. Preferably, the piping section of the secondary stream conduit (primary bypass) comprises a magnetic valve downstream of the primary ultrafiltration unit between the junction to the secondary bypass and the connection to the circulation piping, which closes when the primary bypass is deactivated and the secondary bypass is activated.

As already outlined before, the system according to the invention preferably comprises a device for heating or cooling through which the circulation piping runs, such that a preferred embodiment of the method is directed to the provision of a heated or cooled liquid.

In the context of the method for providing a heated liquid for human consumption, the system comprises a device for heating a liquid such as e.g. drinking water, as well as, in addition to the circulation piping and the bypass conduit, a further piping which is connected to the circulation piping via the points for feeding a liquid into and for withdrawing or disposing a liquid from the circulation piping, respectively. The additional facultative and optional components of this enlarged piping system have already been explained extensively which is why reference is made to these explanations. The method based on this enlarged piping system not only enables the provision of hot water for human consumption, but also comprises the provision of cold water for human consumption and thus, in addition to the purification of the hot water channeled in the circulation piping, optionally enables the purification of the (cold) liquid fed into the conduit section B, the purification of the (e.g. stagnant) liquid present in the cold water-bearing region of the conduit section A up to the transition valve, and/or the purification of the (e.g. stagnant) liquid present in the warm water-bearing region of the conduit section A up to the transition valve, wherein the respective purification is performed by the ultrafiltration unit (primary ultrafiltration unit, if applicable).

In a further aspect of the invention, there is provided a method for saving energy in providing a heated liquid for human consumption upon control of the admissible, recommended or acceptable values for microorganisms. In the context of this application, a closed (s.a.) piping system is used which comprises a closed (s.a.) circulation piping with a circulation means and at least one point each for feeding a liquid in and for withdrawing a liquid from the circulation piping, respectively, a single ultrafiltration unit for the mechanical separation of microorganisms, and a bypass conduit, in the course of which the single ultrafiltration unit is arranged, as well as a device for heating, through which the circulation piping runs for heating the liquid channeled therein. On the basis of the findings explained herein, and the advantages which can be achieved by using the system according to the invention, the set temperature for the device for heating can be adjusted to a value of below 60° C., preferably to a value between 40 and 55° C., most preferably to a value between 43 and 48° C. In consideration of the lowering of the set temperature enabled according to the invention as compared to common standard values or guidelines for water intended for human consumption (at least 60° C.) of ca. 15° C., enormous ways of energy saving arise. When additionally considering the multitude of public and private sanitary installations which can be optimized according to the invention, quite a number of terawatt hours of energy can, if only Germany is taken into account, be saved annually. It is clear for a skilled person that the potential for energy saving also exists to at least the same extent in regard to the enlarged piping system which, in addition to the warm water circuit as primary circuit, also comprises a cold water-bearing conduit with a transition valve and a connecting pipe to the bypass conduit of the primary circuit.

Due to the simple design and unproblematic maintenance of the components, the system and the method are suitable to be used for the operation in the field of public piping networks and in the domestic field of private piping networks as well as for mobile systems.

Due to the simple combinability of the system according to the invention with corresponding sensor technology, the reaction time between the occurrence of an undesired contamination and its removal can be shortened significantly.

DETAILED DESCRIPTION

Figure 1:
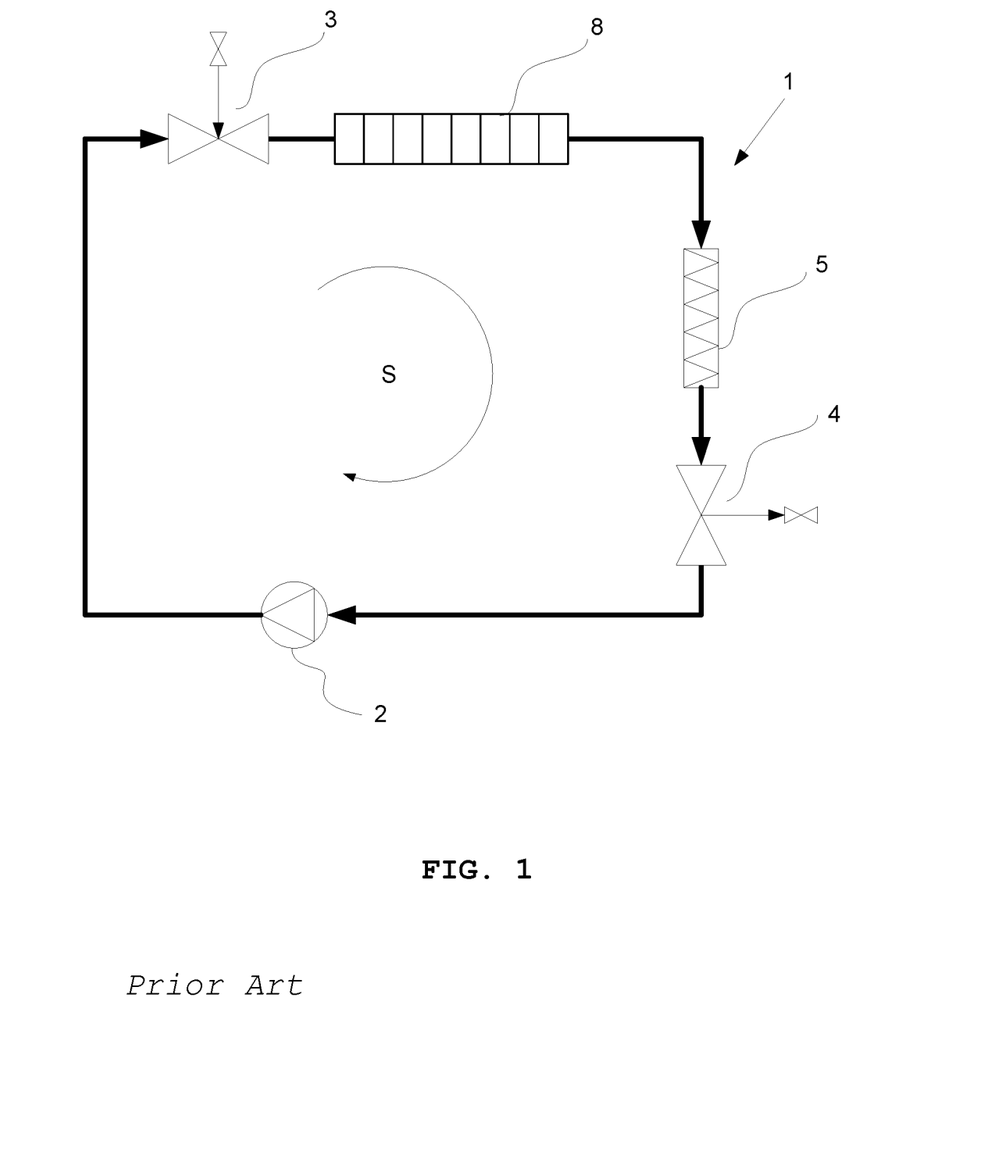
FIG. 1 shows a piping system according to the prior art.

In FIG. 1 a piping system as known in the art is depicted. A liquid such as e.g. water can be fed into the circulation piping 1 of the system via the point of feed-in 3. By activating the circulation means 2, the liquid flows in streaming direction S and passes a device for the mechanic separation of microorganisms in particular such as an ultrafiltration unit 5 such that purified liquid can be withdrawn from a point of withdrawal 4 being arranged downstream of the point of feed-in 3. In case the liquid shall be provided at the point of withdrawal 4 in a heated or cooled manner, the circulation piping 1 runs through a suitable device for heating or cooling.

Figure 2:
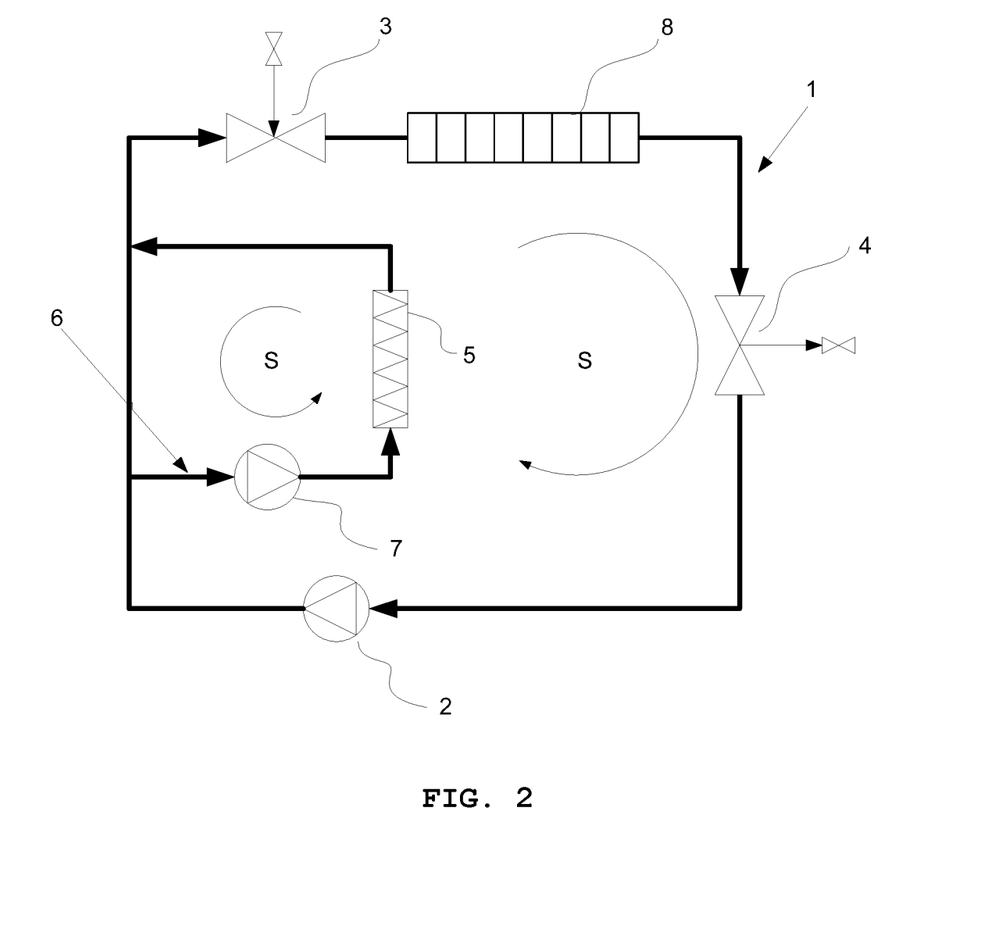
FIG. 2 shows a piping system according to a first embodiment.

FIG. 2 depicts a piping system according to the invention which, in the sense of the afore-mentioned definition, is closed, wherein the ultrafiltration unit 5 is not arranged in the main stream of the circulation piping 1, but in the secondary stream of a bypass conduit 6. Although the bypass conduit 6 is arranged preferably downstream of the point of withdrawal and thus between the point of withdrawal 4 and the point of feeding-in 3, the bypass may also be positioned in any other section of the circulation piping 1. In streaming direction S, the bypass comprises a bypass conduit 6, a conveyance means 7, as well as the ultrafiltration unit 5. As already explained for FIG. 1, the circulation piping 1 runs through a device for heating or cooling 8, wherein this device may generally be arranged in any section or at any point of the circulation piping 1 such as e.g. in the region of the point of feeding-in 3.

Figure 3:
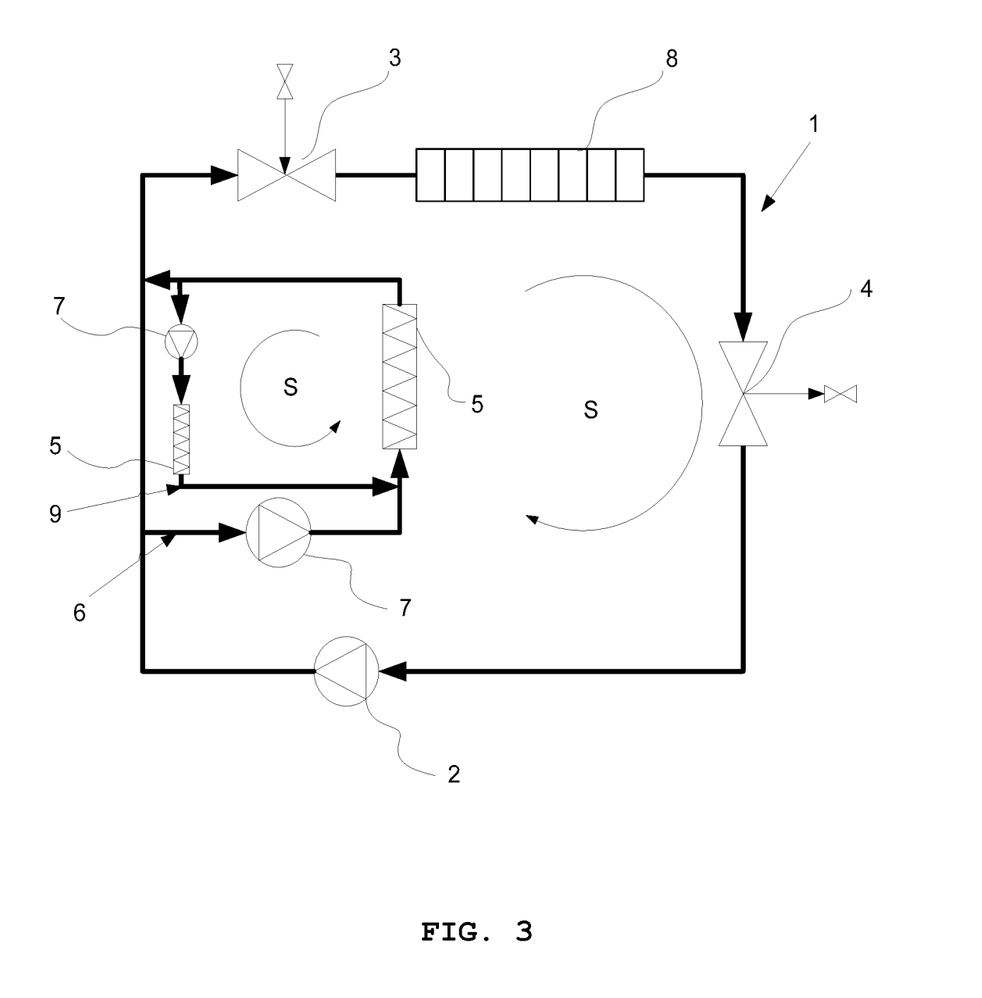
FIG. 3 shows a second embodiment of the piping system according to the invention.

FIG. 3 shows a preferred embodiment of the piping system according to the invention as shown in FIG. 2, in which a secondary bypass 9 is arranged within the bypass (primary bypass) 6. This secondary bypass 9 comprises in streaming direction S a conveyance means 7 as well as a further ultrafiltration unit (secondary UF) 5. Upon operating this embodiment, the liquid volume being present in the bypass conduit 6 downstream of the ultrafiltration unit (primary UF) 5 may again be directed to this ultrafiltration unit 5 via the secondary bypass 9 with its further ultrafiltration unit (secondary UF) 5, at least partially. Already purified but, due to stagnation in the bypass conduit 6, re-contaminated liquid may thus again be fed into the ultrafiltration unit 5 of the secondary stream conduit 6, where it is again subjected to purification instead of being fed into the circulation piping 1 in its re-contaminated state. It is clear in this context that, in principle, the connection between the bypass conduit 6 downstream of the ultrafiltration unit 5 and the secondary bypass 9 may be positioned deliberately, albeit it is advantageously placed as near as possible to the junction for the circulation piping 1. It is also clear that the point at which a feeding from the secondary bypass 9 into the bypass conduit 6 or into the ultrafiltration unit 5 takes place is variable. Thus, it may also be positioned in the region upstream of the conveyance means 7 of the bypass conduit 6. It is, however, advantageous to select the position as shown in FIG. 3 because in this manner the amount of returned liquid may be minimized without deteriorating the function being preferred according to the invention.

Figure 4:
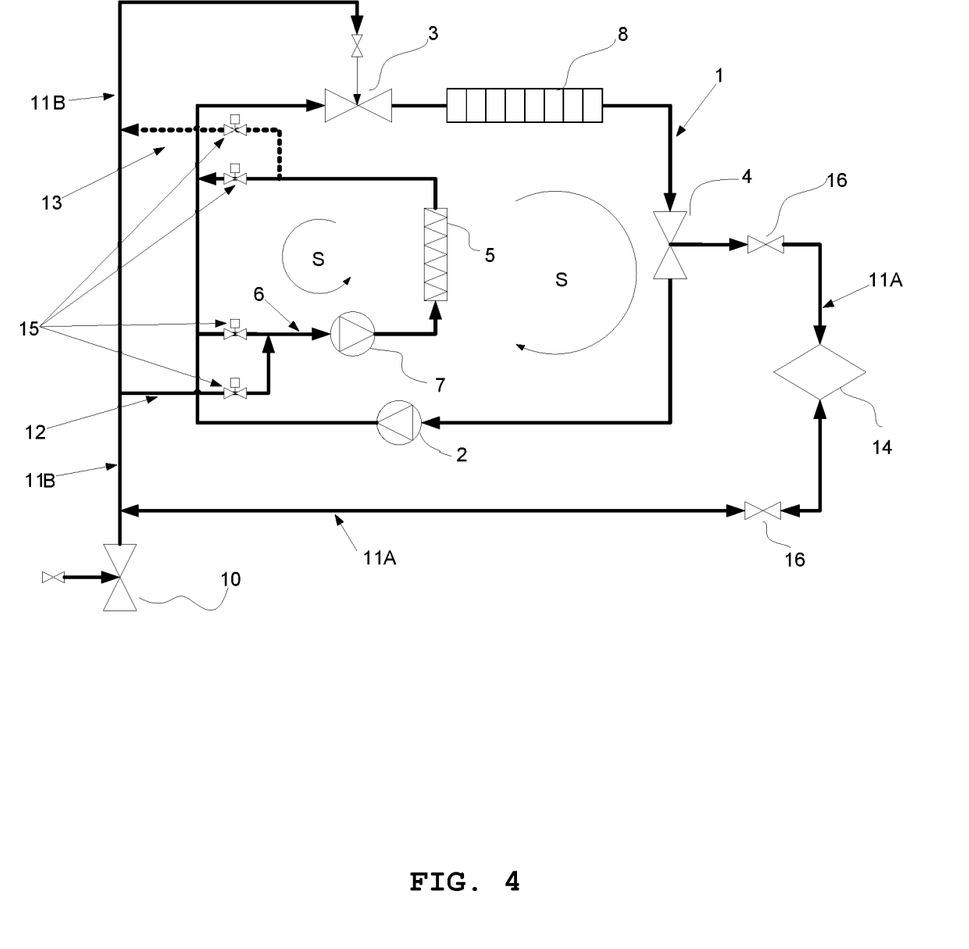
FIG. 4 shows a third embodiment of the piping system according to the invention.

FIG. 4 shows an enlargement of the piping system according to the invention shown in FIG. 2. The enlargement relates to a further piping 11 which, in the sense of the present definition, is closed and has two functionally different but interconnected piping sections 11A and 11B. Fresh (cold) water intended for human consumption can be fed into the circulation pipe 1 via a further point (cold water point) 10 over the piping section 11B and the point 3. Alternatively or additionally, the feeding of fresh water into the circulation piping 1 may take place via the piping section 11B and a connection conduit 12 to the bypass conduit 6. Via the piping section 11A, fresh (cold) water intended for human consumption may further be channeled to the transition valve 14, which is why this region of the piping section 11A may also be termed cold water-bearing conduit. The region of the piping section 11A stretching from beyond the transition valve 14 up to the point 4 serves the feeding of hot water from the circulation piping 1 via point 4 to the transition valve 14 and can thus be named hot water-bearing region of the piping section 11A. The transition valve 14 is designed such that hot water from the hot water-bearing region of the piping section 11A may pass into the cold water-bearing region of the same piping section, while preventing water being present in the cold water-bearing region of the piping section 11A from passing into the hot water-bearing region of the piping section 11A.

The transition valve 14 may be an integral component of a common consumption unit such as e.g. a shower, or it merely may be functionally allocated to this unit. The transition valve may be permanently opened or preferably designed as a control valve, with a temperature-controlled control valve such as e.g. a thermostat being particularly preferred. Preferably, the piping section 11A comprises a respective angle valve for blocking on both sides of the transition valve 14. Furthermore, the system, if desired, may comprise a further connection conduit 13 between the bypass conduit 6 and the piping section 11B, wherein both mentioned connection conduits preferably comprise suitable valves 15.

It results from this FIG. 4 and the corresponding explanations that the closed piping system as shown in FIGS. 2 and 3 is connected at at least 3 points (point 3; point 4; point between connection conduit 12 and by pass conduit 6) with the further closed piping system which essentially serves to channel cold water but additionally also is able of taking over purification tasks. If the transition valve 14 is open, activating the conveyance means 7 in the bypass conduit 6 can, depending on the states of the valves 15 (opened/closed), cause a (purifying) circulation of the water present in the circulation piping 1 and/or a (purifying) circulation of the water present in the further piping 11, particularly in the piping section 11A. When appropriately adjusting the involved valves, it may precisely be decided which of both pipings (circulation piping 1 and/or further piping 11) shall be purified, and if the water purified by the ultrafiltration unit 5 (primary ultrafiltration unit, if applicable) shall be fed to the circulation piping 1 and/or to the piping section 11B. By activation of the conveyance means 7, hot water intended for human consumption streams via the point of withdrawal 4, the hot water-bearing region of the piping section 11A, the transition valve 14 and the further course of piping 11 via the connection conduit 12 and the ultrafiltration unit 5 in bypass 6 into the circulation piping 1, and/or optionally via the connection conduit 13 back into the piping section 11B and from there via point 3 into the circulation piping 1. Thus, it is possible according to the invention to not only subject the hot water present in the circulation piping 1, but also the water present in the complete piping section 11A mostly primarily serving the cold water channeling to a thorough purification with only one (two, if applicable) ultrafiltration unit(s). With other words, an appropriate adjustment of the involved valves in normal operation such as e.g. during the day enables to purify a partial flow of the hot water in the circulation piping 1 via the bypass conduit 6 by the ultrafiltration unit 5. In the remaining time such as e.g. during the night when no consumption unit such as e.g. a shower is used, the valves to the circulation piping 1 are closed and the valves to the further piping 11 such as particularly those to the piping section 11A are opened such that the purification of the essentially cold water can take place, wherein the conveyance means 7 in bypass 6 takes over the pumping function for the cold water circulation.

The enlarged piping system according to the invention thus serves to ensure the drinking water hygiene in domestic drinking water installations, but moreover also enables to flush the hot water- as well as the cold water-bearing pipes with ultra filtrated drinking water.

Furthermore, by the aid of the system according to the invention and the operating states selected by opening and closing of the valves 15, energy can be saved by coordinating the valve timings with the timings of the heating control of the hot water preparation. The purification of section A of piping 11 is performed e.g. preferably when a low temperature is selected in the hot water-bearing section which typically is the case upon night lowering. In this manner, a purification may be performed without unnecessarily loosing warmth due to the mostly poorly insulated cold water pipings.

It is clear that the system according to the invention may comprise additional components such as, in particular, rinse connections for the ultrafiltration unit(s) 5, inoculation points, points of withdrawal, sensors, control systems, valves, etc., which for reasons of clarity are not depicted.

For this, reference is made to the description hereinbefore where corresponding detailed information is given.

Example

In the following, an example is given for illustrating the operability of the teaching according to the invention. It is bases on experiments which had been performed in the course of a research project in the run-up to the application. Part of these experiments were already disclosed in detail in applicants prior application now published (EP 2 474 506 B1).

A colonization of habits in technical systems such as pipings and fittings by microorganisms is a natural process. In principle, two strategies for removing bacteria and viruses from drinking water (hygienization) are followed:

A. Complete (100%) removal of present contaminations
B. Reduction of present contaminations while complying with existing admissible limit values.

Although a sustained removal of vagrant contaminations within pipe networks or of biofilms on their surfaces may take place by the aid of chemical or physical methods, the success will only be short-termed because unsettled habits do not exist in nature. Furthermore, the applicability of these methods are severely limited by law.

In reducing present contaminations it is necessary to reduce unavoidably present contaminations according to legal regulations such that they cannot cause any health risks. However, there is no legal norm for the provision of sterile drinking water in residential buildings.

At the beginning of the research, strategy A was followed to completely remove present contaminations. A UF-membrane unit was installed at the house feeding of a drinking water piping of a newly built sports hall in order to completely seal it off against external microbiologic influences. A UF-membrane installed in the direct volume stream of the hot water circulation should have trapped and removed bacteria and viruses unavoidably present within the piping.

It appeared that membrane surfaces under operation conditions which are typically predominant in buildings (stagnation, temperatures higher than 20° C.) tend to contaminate. According to the teaching of EP 2 274 506 B1, the resulting problems could be solved impressively by again feeding the (temporarily non-streaming) liquid in the conduit section downstream of an ultrafiltration unit arranged in the main stream, i.e. between the outlet of this unit and a point of withdrawal, at least partially, into this unit via a bypass, wherein a further ultrafiltration unit was present in this bypass.

Although realization of the teaching of EP 2 474 506 B1 led to excellent results, its implication was cumbersome and thus cost intensive due to the necessary installations.

It could be shown in further research that the water quality of the municipal water supply of two German states (Schleswig-Holstein and Hamburg) reliably complied with legal requirements while only minor contamination potentials were introduced into building systems.

Simultaneously, it was found that a permanent hygienization of pipings can only be achieved if both cold and hot water were treated and only minor construction and operation costs were caused. Accordingly, the field of applicability of the membrane technology was extended to also comprise cold water pipings.

Based on these findings, a strategy of reduction has been established in the context of the present invention which renounces a complete removal of contaminations and ensures a careful separation of bacteria and viruses from pipings within admissible limit values by appropriately combining pump technology, membrane filtration and controlling.

In a multitude of laboratory and field experiments, the plant engineering was developed to such an extent that the use of the membrane unit in the circulating main stream was no longer necessary and took place in a bypass. It is common in this setting, that only a part of the drinking water volume present in the piping streams through the membrane filter unit.

By appropriately programming the operating periods of the membrane unit, a reduction of contamination up to the technical detection limit can be achieved. It was observed that the contamination of membrane surfaces in circulating pipings due to stagnation can be prevented by certain construction principles and operation modes, without necessitating the teaching of EP 2 474 506 B1.

When using membrane units in the main volume stream (strategy A; EP 2 474 506 B1), the filter surface, due to the peak volume stream of a piping, depends on the necessary pass-through. Accordingly, a specific design and construction of membrane units is required for each operation site.

In the contrary, when using bypass settings (strategy B according to the present invention), standardized filtration units are possible whose performance depends on variably programmed operation periods. Due to the significant technical simplification, such membrane units can be constructed and operated at comparably low cost.

With regard to the question as to which strategic approach for hygienization to follow, also energetic aspects are to be considered.

According to the prior art, a sustained hygienization of drinking water is only possible by thermal treatment with temperatures above 60° C. This temperature level significantly contradicts the efforts in increasing energy efficiency and in using regenerative energy sources.

In the course of experiments conducted for the present invention, it could be shown that corresponding pipings can be hygienized with UF-membrane units up to the detection limit completely independent from temperature. It was particularly observed when using the system according to the invention that an eventually present contamination could at any time be kept at the microbiological detection limit and thus significantly below the legal limit value, even upon lowering the temperature of the circulating water to 56 or even to 51° C. The achievable energy saving resulting from the temperature lowering of ca. 10° C. as compared to the minimal temperature of 60° C. as generally required is considerable and opens unforeseen possibilities for increasing energy efficiency when the multitude of existing households and installations in the public domain are taken into account.

LIST OF REFERENCE NUMBERS

1 Circulation conduit; circulation piping
2 Circulation means
3 Point of feed-in; point for feeding-in
4 Point of withdrawal; point for withdrawal
5 Ultrafiltration unit(s) (primary/secondary)
6 Bypass conduit, bypass, secondary stream conduit, primary bypass
7 Conveyance means
8 Device for heating/cooling
9 Secondary bypass
s Streaming direction
10 Point of feed-in; point for feeding-in; cold water-point
11 (further) piping; cold water conduit; cold water piping
11A, 11B Piping section; conduit section
12, 13 Connection conduit; connection piping
14 Valve; transition valve
15 Valves
16 Angle valve; angles valve

What is claimed is:

1. A method for channeling heated water for human consumption in a circuit while controlling for microorganisms by using a piping system that is under pressure and closed to contact between said heated water for human consumption and any ambient air or other microbial contamination source, wherein said piping system may be temporarily opened only for feeding, withdrawal or maintenance operations, such that said heated water for human consumption within said piping system is maintained within said piping system under pressure until its withdrawal and wherein said piping system comprises circulation piping (1) with a circulation means (2) and at least one point each for feeding-in (3) water for human consumption to the circulation piping system and for withdrawal (4) of heated water for human consumption from the circulation piping system, wherein within said circulation piping said at least one point for feeding-in (3) water for human consumption is separated from said at least one point for withdrawal (4) of heated water for human consumption by a conduit section closed to ambient air and under pressure, a single ultrafiltration unit (5) for the mechanical separation of microorganisms, and a bypass conduit (6) in the course of which the single ultrafiltration unit (5) and a conveyance means (7) are arranged, and a heating device (8) through which said circulation piping (1) runs for heating water guided through said circulation piping (1), and wherein a set temperature for the heating device (8) is adjusted to between 40° C. and 55° C. thereby heating the water for human consumption in the circulation piping (1) to a maintained temperature range of 40° C. to 55° C. and, wherein said controlling for microorganisms is performed by temporarily directing at least part of the heater water for human consumption being guided in said circulation piping (1) to the ultrafiltration unit (5) arranged in the bypass conduit (6).

2. The method according to claim 1, wherein a quantitative and/or qualitative measuring of microorganisms in the heated water for human consumption is performed continuously or discontinuously.

3. The method according to claim 1, wherein said piping system further comprises a device for cooling such that the heated water for human consumption therein is cooled.

4. The method according to claim 1, comprising a further piping (11) which is connected with the circulation piping (1) via points (3) and (4), wherein the piping (11) comprises two piping sections (11A) and (11B), a point for feeding (10) a liquid into the piping (11), as well as a transition valve (14) being arranged in piping section (11A), wherein the piping section (11B) is connected with the bypass conduit (6) via a connection conduit (12) upstream of the ultrafiltration unit (5), and wherein said controlling for microorganisms is performed by directing the heated water for human consumption present in the circulation piping (1) and/or in the further piping (11) to the ultrafiltration unit (5) arranged in the bypass conduit (6).

5. A method for saving energy in the course of providing heated water for human consumption while controlling for microorganisms, the method comprising:

providing heated water for human consumption using a piping system that is closed to contact between said heated water for human consumption and any ambient air or other microbial contamination sources and is under pressure, wherein said piping system that is closed to contact between said heated water for human consumption and any ambient air or other microbial contamination sources and under pressure may be temporarily opened only for feeding, withdrawal or maintenance operations, such that said heated water liquid for human consumption drinking within said piping system is maintained within said piping system under pressure until its withdrawal and wherein said piping system comprises circulation piping (1) with a circulation means (2) and at least one point for feeding-in (3) water for human consumption to the circulation piping system and at least one point for withdrawal (4) of heated water for human consumption from said circulation piping system, wherein within said circulation piping said at least one point for feeding-in (3) water for human consumption is separated from said at least one point for withdrawal (4) of heated water for human consumption by a conduit section closed to ambient air and under pressure, a single ultrafiltration unit (5) for the mechanical separation of microorganisms, and a bypass conduit (6) in a course of which the single ultrafiltration unit (5) and a conveyance means (7) are arranged, and a heating device (8) through which said circulation piping (1) runs for heating water for human consumption guided through said circulation piping (1), and wherein a set temperature for the heating device (8) is adjusted to between 40° C. and 55° C. thereby heating the water for human consumption in the circulation piping (1) to a maintained temperature range of 40° C. to 55° C.; and controlling for microorganisms by temporarily directing at least part of the heated water for human consumption being guided in said circulation piping (1) to the ultrafiltration unit (5) arranged in the bypass conduit (6) thereby saving energy in the course of providing said heated water for human consumption by maintaining the temperature of the heated water for human consumption at between 40° C. and 55° C. as compared to maintaining the temperature of the heated water for human consumption at least at 60° C.

6. The method according to claim 5, wherein the bypass conduit (6) is arranged within said circulation piping (1) downstream of said at least one point of withdrawal (4) of heated water for human consumption from said circulation piping system and thus between said at least one point of withdrawal (4) of heated water for human consumption from the circulation piping system and said at least one point of feeding-in (3) water for human consumption to the circulation piping system.

7. The method according to claim 5, wherein the circulation means (2) or the conveyance means (7) is a pump.

8. The method according to claim 5, wherein the ultrafiltration unit (5) comprises an outlet for the disposal of a cleaning liquid wherein said cleaning liquid may be fed into said piping system by a temporary opening of said at least one point of feeding-in (3) water for human consumption to the circulation piping system in said piping system and said cleaning liquid may be withdrawn by a temporary opening of a point of discharge from said at least one point of withdrawal (4) of heated water for human consumption from the circulation piping system of said piping system.

9. The method according to claim 5, wherein said piping system further comprises at least one diagnostic means for the qualitative or quantitative determination of microorganisms in said heated water for human consumption.

10. The method according to claim 5, wherein said piping system further comprises a device selected from the group consisting of a biosensor, a turbidity sensor, a streaming sensor, a pressure sensor, a sand filter, a UV-disinfector unit, a heat treatment unit, an inoculation point, and a sampling point.

11. The method according to claim 5, wherein a quantitative or qualitative measuring of microorganisms in said heated water for human consumption is performed continuously or discontinuously.

12. The method according to claim 11, wherein the quantitative or qualitative measuring is performed periodically in predetermined time intervals or program-controlled at predetermined time points.

13. The method according to claim 11, wherein said temporarily directing at least part of said heated water for human consumption being guided in said circulation piping (1) to the ultrafiltration unit (5) arranged in the bypass conduit (6) is performed on demand in dependence of the measuring data obtained.

14. The method of claim 5, wherein the heating device (8) is adjusted to a value between 43° C. and 48° C.

15. A method for saving energy in the course of providing a heated water for human consumption while controlling for microorganisms, the method comprising:

providing heated water for human consumption using a piping system that is closed to contact between said heated water for human consumption and any ambient air or other microbial contamination sources and subject to pressurized conveyance energy, wherein said piping system that is closed to contact between said heated water for human consumption and any ambient air or other microbial contamination sources and subject to pressurized conveyance energy may be temporarily opened only for discharge of said heated water for human consumption or for feeding-in water for human consumption under pressurized conveyance energy or for maintenance operations, such that said heated water for human consumption within said piping system that is closed to contact between said heated water for human consumption and any ambient air or other microbial contamination sources and subject to pressurized conveyance energy is maintained within said piping system that is closed to contact between said heated water for human consumption and any ambient air or other microbial contamination sources and subject to pressurized conveyance energy until its discharge, and wherein said piping system that is closed to contact between said heated water for human consumption liquid and any ambient air or other microbial contamination sources and subject to pressurized conveyance energy comprises circulation piping (1) with a circulation means (2) and at least one point for pressurized feeding-in (3) water for human consumption to the circulation piping system and at least one point for discharge (4) of heated water for human consumption from the circulation piping system, a single ultrafiltration unit (5) for the mechanical separation of microorganisms, and a bypass conduit (6) in a course of which the single ultrafiltration unit (5) and a conveyance means (7) are arranged, and a heating device (8) through which said circulation piping (1) runs for heating water guided through said circulation piping (1), and wherein a set temperature for the heating device (8) is adjusted to between 40° C. and 55° C. thereby heating the water for human consumption in the circulation piping (1) to a maintained temperature range of 40° C. to 55° C.; and controlling for microorganisms by temporarily directing at least part of the heated water for human consumption being guided in said circulation piping (1) to the ultrafiltration unit (5) arranged in the bypass conduit (6)

thereby saving energy in the course of providing said heated water for human consumption by maintaining the temperature of the heated water for human consumption at between 40° C. and 55° C. as compared to maintaining the temperature of the heated water for human consumption at least at 60° C.

* * * * *

UNITED STATES PATENT AND TRADEMARK OFFICE
CERTIFICATE OF CORRECTION

| | |
|---|---|
| PATENT NO. | : 11,565,951 B2 |
| APPLICATION NO. | : 15/103510 |
| DATED | : January 31, 2023 |
| INVENTOR(S) | : Uwe Hartig et al. |

It is certified that error appears in the above-identified patent and that said Letters Patent is hereby corrected as shown below:

In the Claims

Column 18, Line 35 Claim 5, delete "liquid"

Column 18, Line 35 Claim 5, before "within" delete "drinking"

Column 20, Line 24 Claim 15, delete "liquid"

Signed and Sealed this
Fifth Day of November, 2024

Katherine Kelly Vidal
*Director of the United States Patent and Trademark Office*